United States Patent [19]
Labreche

[11] Patent Number: 5,325,558
[45] Date of Patent: Jul. 5, 1994

[54] WHEELCHAIR RAMP APPARATUS

[76] Inventor: Brent J. Labreche, 8329 Wren Rd. SE., Ft. Myers, Fla. 33912

[21] Appl. No.: 130,686

[22] Filed: Oct. 4, 1993

[51] Int. Cl.$^5$ .................... B65G 67/02; E01D 15/00
[52] U.S. Cl. .................................. 14/69.5; 414/537
[58] Field of Search ............... 14/69.5, 71.1, 2.4; 414/537, 921, 401, 402; 238/10 R; 193/41; 104/134

[56] References Cited

U.S. PATENT DOCUMENTS

| | | | |
|---|---|---|---|
| 3,532,058 | 10/1970 | van der Meide | 238/10 R |
| 3,820,912 | 6/1974 | Hughes | 14/69.5 X |
| 4,528,711 | 7/1985 | Packer | 14/69.5 |
| 4,874,284 | 10/1989 | New, Jr. | 14/69.5 X |
| 5,143,478 | 9/1992 | Bowman | 404/26 |

FOREIGN PATENT DOCUMENTS

| | | | |
|---|---|---|---|
| 2597129 | 10/1987 | France | 14/2.4 |
| 2611682 | 9/1988 | France | 414/401 |

Primary Examiner—Thuy M. Bui
Assistant Examiner—James A. Lisehora
Attorney, Agent, or Firm—E. Michael Combs

[57] ABSTRACT

A wheelchair ramp structure is arranged to include first and second U-shaped tracks hingedly mounted relative to one another cooperative and parallel to third and fourth U-shaped tracks, wherein the first and third U-shaped tracks include an adjusting connector link directed therebetween to provide for adjustment and maintaining such adjustment in a spatial relationship of the first and second tracks relative to the third and fourth tracks. The first and second tracks are arranged for hinged mounting relative to one another, as well as the third and fourth tracks permitting ease of storage of the organization during periods of non-use.

3 Claims, 4 Drawing Sheets

WHEELCHAIR RAMP APPARATUS

BACKGROUND OF THE INVENTION

1. Field of the Invention

The field of invention relates to wheelchair ramp structure, and more particularly pertains to a new and improved wheelchair ramp apparatus wherein the same is directed to the ease of positioning and mounting relative to a vehicle relative to a vehicle relative to loading and unloading a wheelchair structure thereto.

2. Description of the Prior Art

Wheelchair ramp structure of various types is indicated in the prior art such as exemplified by the U.S. Pat. Nos. 4,528,711; 4,912,796; 3,874,527; as well as U.S. Pat. No. 5,033,146.

The instant invention attempts to overcome deficiencies of the prior art by providing for wheelchair ramp structure arranged for compact storage, as well as maintaining proper positioning and capturing of a wheelchair within U-shaped track structure and in this respect, the present invention substantially fulfills this need.

SUMMARY OF THE INVENTION

In view of the foregoing disadvantages inherent in the known types of wheelchair ramp structure now present in the prior art, the present invention provides a wheelchair ramp apparatus wherein the same includes U-shaped ramp structure arranged to maintain a wheelchair in a secured orientation during a loading and unloading relative to an associated motor vehicle. As such, the general purpose of the present invention, which will be described subsequently in greater detail, is to provide a new and improved wheelchair ramp apparatus which has all the advantages of the prior art wheelchair ramp apparatus and none of the disadvantages.

To attain this, the present invention provides a wheelchair ramp structure arranged to include first and second U-shaped tracks hingedly mounted relative to one another cooperative and parallel to third and fourth U-shaped tracks, wherein the first and third U-shaped tracks include an adjusting connector link directed therebetween to provide for adjustment and maintaining such adjustment in a spatial relationship of the first and second tracks relative to the third and fourth tracks. The first and second tracks are arranged for hinged mounting relative to one another, as well as the third and fourth tracks permitting ease of storage of the organization during periods of non-use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wheelchair ramp apparatus which has all the advantages of the prior art wheelchair ramp apparatus and none of the disadvantages.

It is another object of the present invention to provide a new and improved wheelchair ramp apparatus which may be easily and efficiently manufactured and marketed.

It is a further object of the present invention to provide a new and improved wheelchair ramp apparatus which is of a durable and reliable construction.

An even further object of the present invention is to provide a new and improved wheelchair ramp apparatus which is susceptible of a low cost of manufacture with regard to both materials and labor, and which accordingly is then susceptible of low prices of sale to the consuming public, thereby making such wheelchair ramp apparatus economically available to the buying public.

Still yet another object of the present invention is to provide a new and improved wheelchair ramp apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
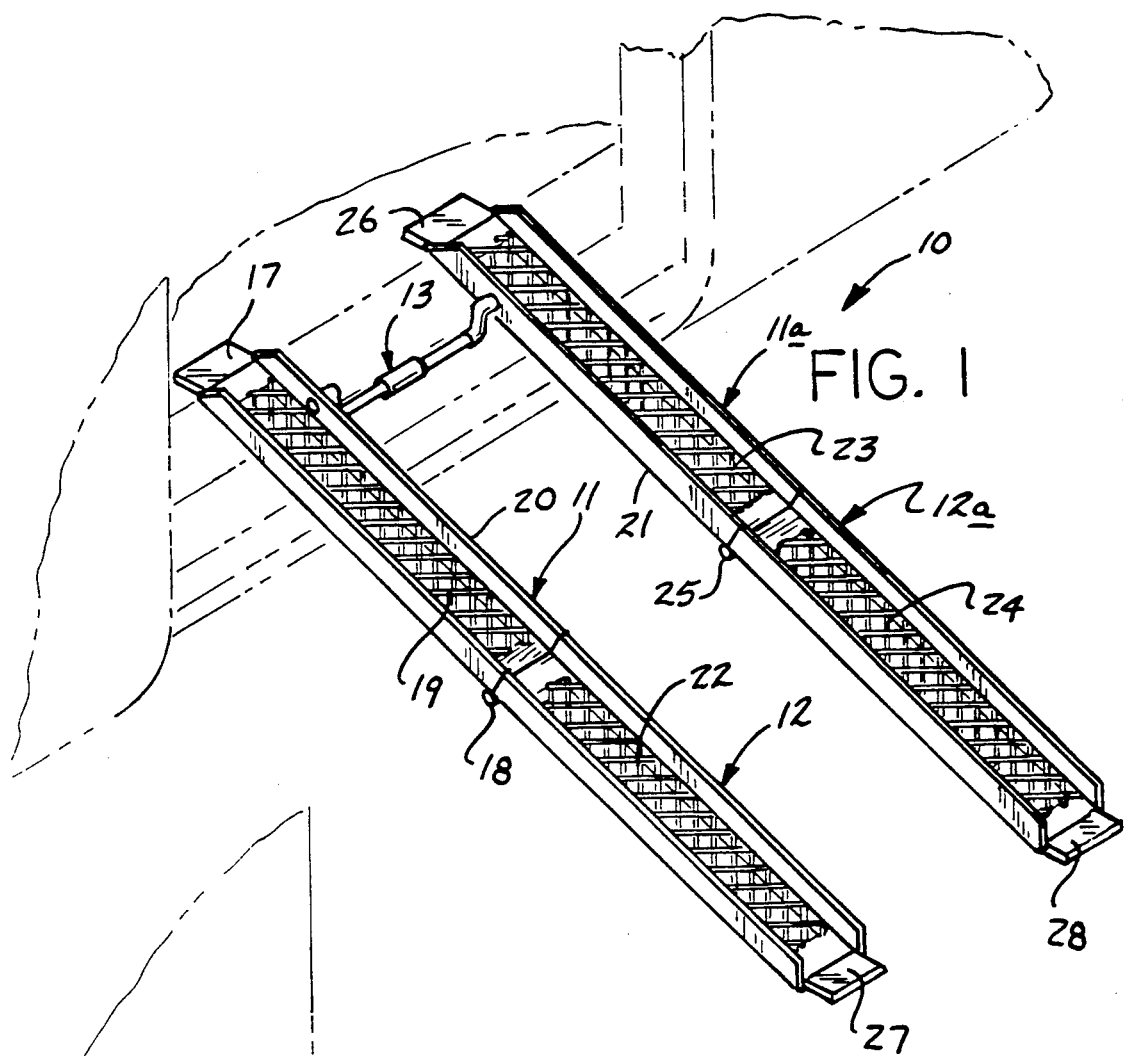
FIG. 1 is an isometric illustration of the invention.

With reference now to the drawings, and in particular to FIGS. 1 to 8 thereof, a new and improved wheelchair ramp apparatus embodying the principles and concepts of the present invention and generally designated by the reference numeral 10 will be described.

Figure 2:
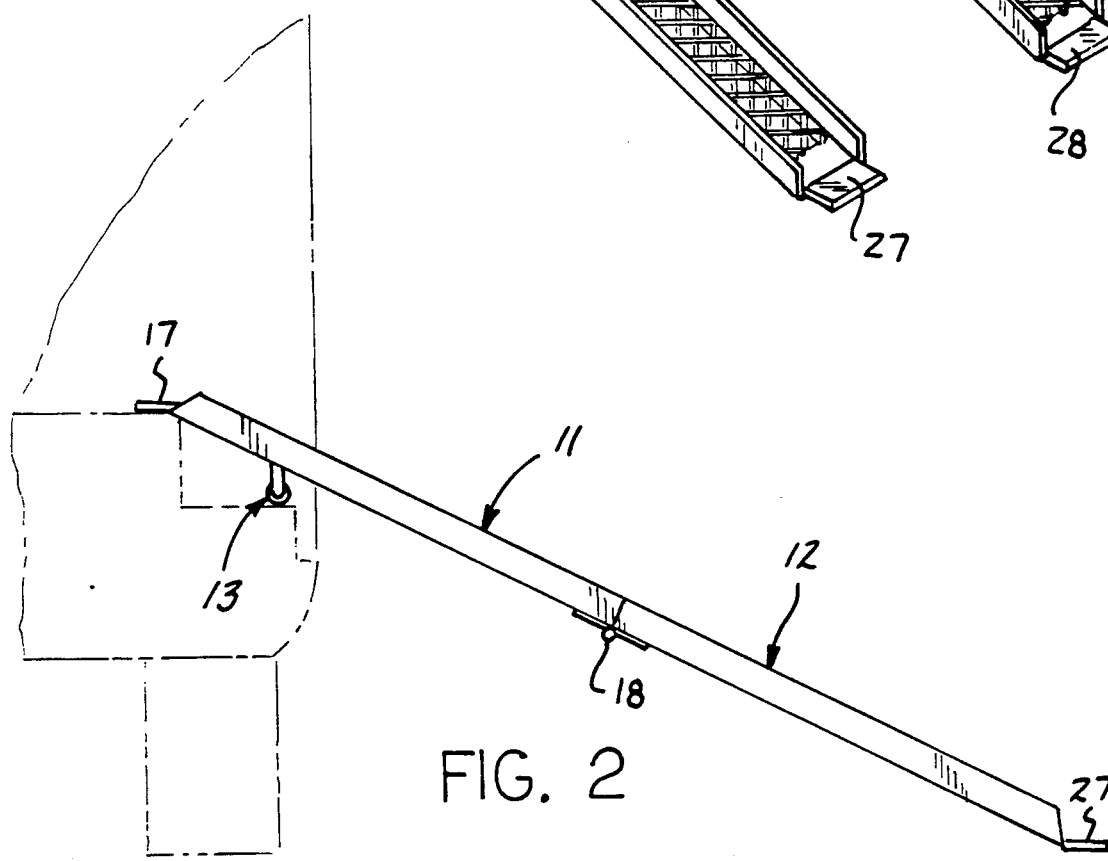
FIG. 2 is an orthographic side view of the ramp structure.
Figure 3:
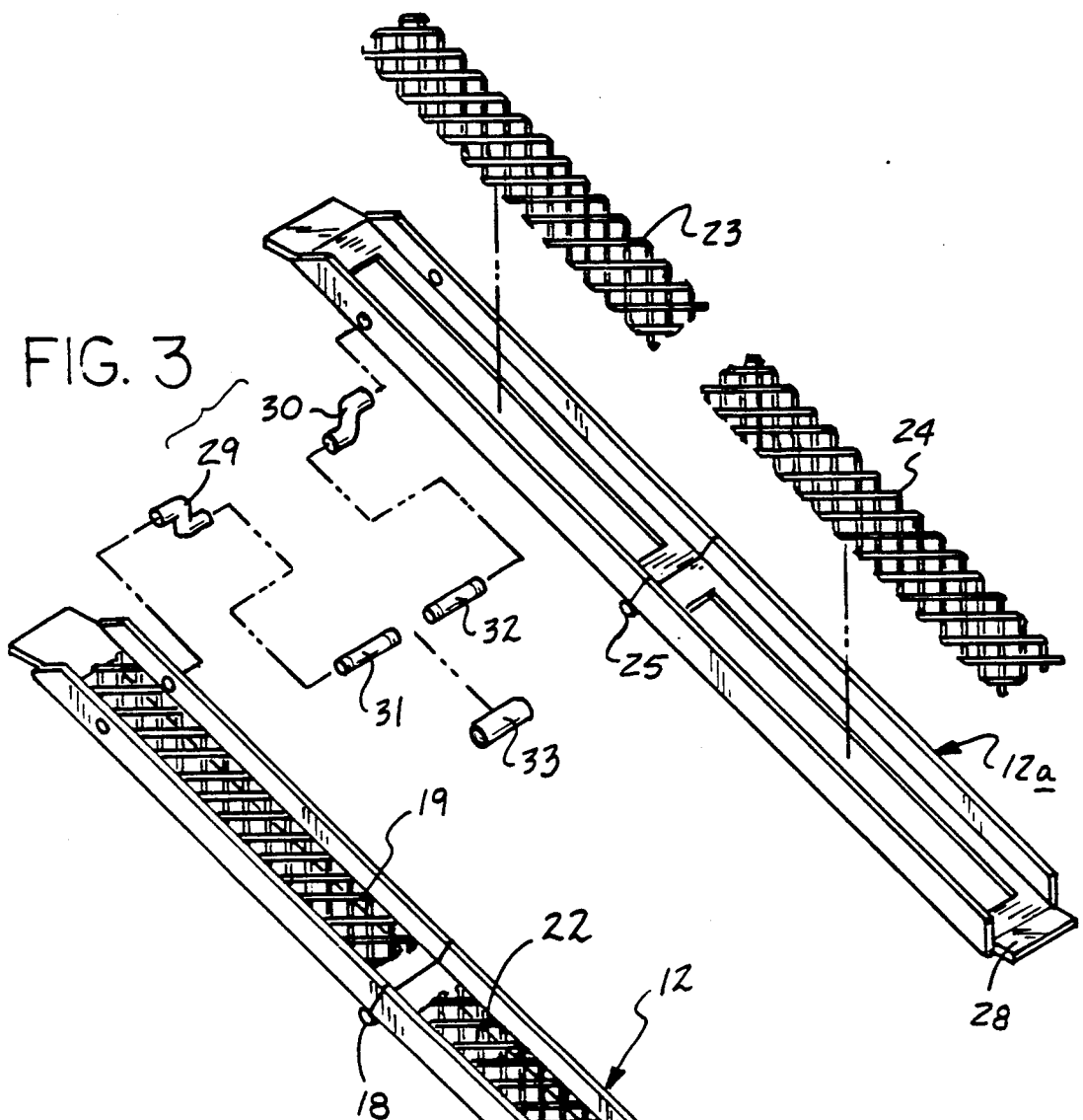
FIG. 3 is an isometric exploded view of the invention.
Figure 4:
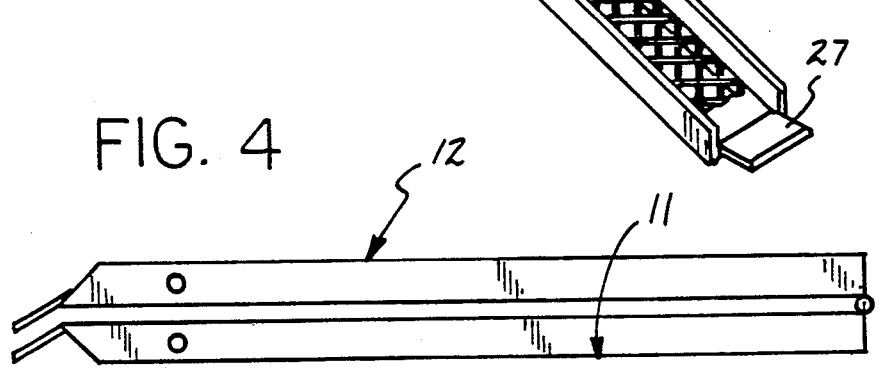
FIG. 4 is an orthographic view of the first and second tracks arranged in a folded relationship relative to one another.

More specifically, the wheelchair ramp apparatus 10 of the instant invention essentially comprises first and second U-shaped tracks 11 and 12 arranged in a longitudinally aligned relationship relative to one another in the first position, as illustrated in FIG. 1, that in turn are parallel to third and fourth U-shaped tracks 11a and 12a respectively. An adjusting connector link 13 is adjustably directed between the first and third U-shaped tracks 11 and 11a respectively to effect a desired spatial relationship therebetween. The first track includes a first track first end mounting plate 17 arranged for mounting upon a floor portion of an associated vehicle, as illustrated in FIG. 2 for example, with a first track second end hinge 18 hingedly mounted to a first end of the second track 12, with the second track including a second track second end positioning plate 27 for support of the second track upon an underlying support surface. The first track includes a first track mesh floor 19, first track side walls 20, with a second track mesh floor 23 coplanar with the first track mesh floor 19 in a first position. The third track includes third track side walls 21, as well as the third track mesh floor coplanar with the fourth U-shaped track mesh floor 24 in the first position. Pivoting of the first and second tracks about the first track second end hinge 18, as well as pivoting of the third and fourth tracks about the third track second end hinge 25 provide the configuration, as illustrated in FIG. 4 for example, wherein the first and second tracks are arranged in a spaced parallel relationship relative to one another. The third track 11a includes a third track first end mounting plate 26 for abutment upon the vehicle floor, with the fourth track 12a having a fourth track second end positioning plate 28. The connecting link 13 includes a first L-shaped link 29 fixedly mounted to one of the first track side walls 20, with a second L-shaped link 30 fixedly mounted to one of the third track side walls 21. A first adjuster rod 31 is fixedly mounted within the first L-shaped link 29, with the first adjuster rod 31 orthogonally oriented relative to the first track side wall 20. A second adjuster rod 32 directed into the second L-shaped link 30 is orthogonally oriented relative to the third track side wall 21, with the first adjuster rod 31 and second adjuster rod 32 arranged coaxially aligned relative to one another. An internally threaded adjuster sleeve 33 threadedly receives the first and second adjuster rods 31 and 32 therewithin at opposed ends of the sleeve 33. To this end (see FIG. 6), a right hand threaded portion 49 cooperates the first adjuster rod 31 within the sleeve, while a left hand threaded portion 50 defines inter-relationship of the second adjuster rod 32 within the sleeve 33. In this manner, rotation clockwise or counter-clockwise of the sleeve 33 effects the drawing together or the spacing apart of the first and third U-shaped tracks 11 and 11a relative to one another.

Figure 5:
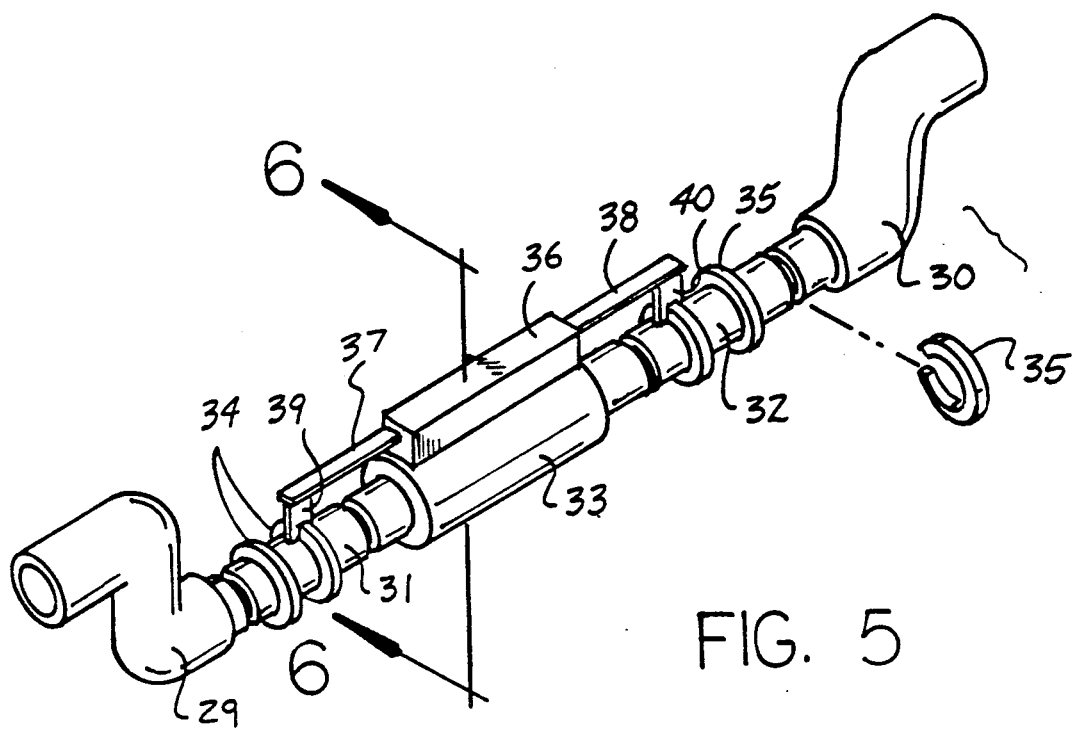
FIG. 5 is an isometric illustration of the connecting link structure.
Figure 6:
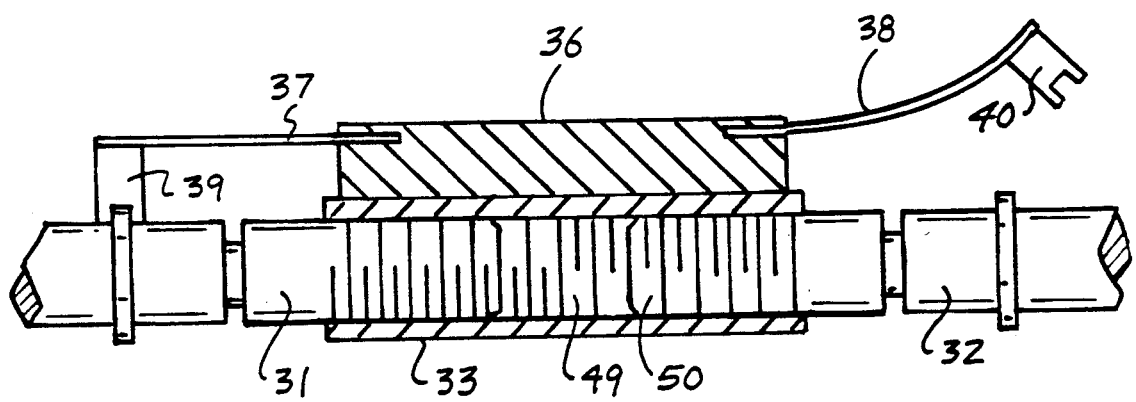
FIG. 6 is an orthographic view, taken along the lines 6—6 of FIG. 5 in the direction indicated by the arrows

The first and second adjuster rods 31 and 32, as illustrated in FIG. 5, are further formed with respective first and second annular discs 34 and 35 mounted about the respective first and second adjuster rods 31 and 32 in a concentric relationship, such that a boss member 36 mounted upon the sleeve 33 includes respective first and second spring plates 37 and 38 projecting from the sleeve extending over the respective first and second adjuster rods 31 and 32. The first spring plate 37 includes a first bifurcated engaging leg 39, while the second spring plate 38 includes a second bifurcated engaging leg 40 to engage the respective first and second annular discs 34 and 35 to maintain the adjusted relationship between the first and third U-shaped tracks 11 and 11a respectively.

Figure 7:
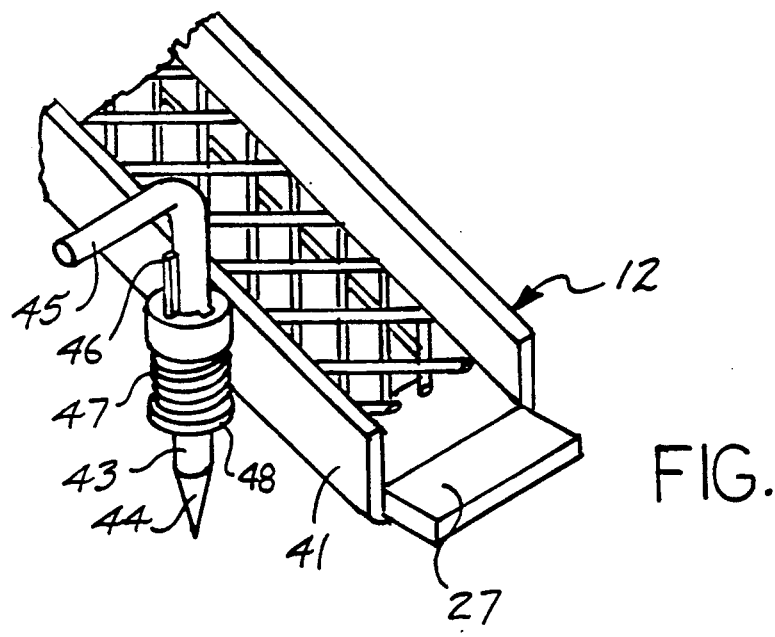
FIG. 7 is an isometric illustration of the second ramp including a locking rod.
Figure 8:
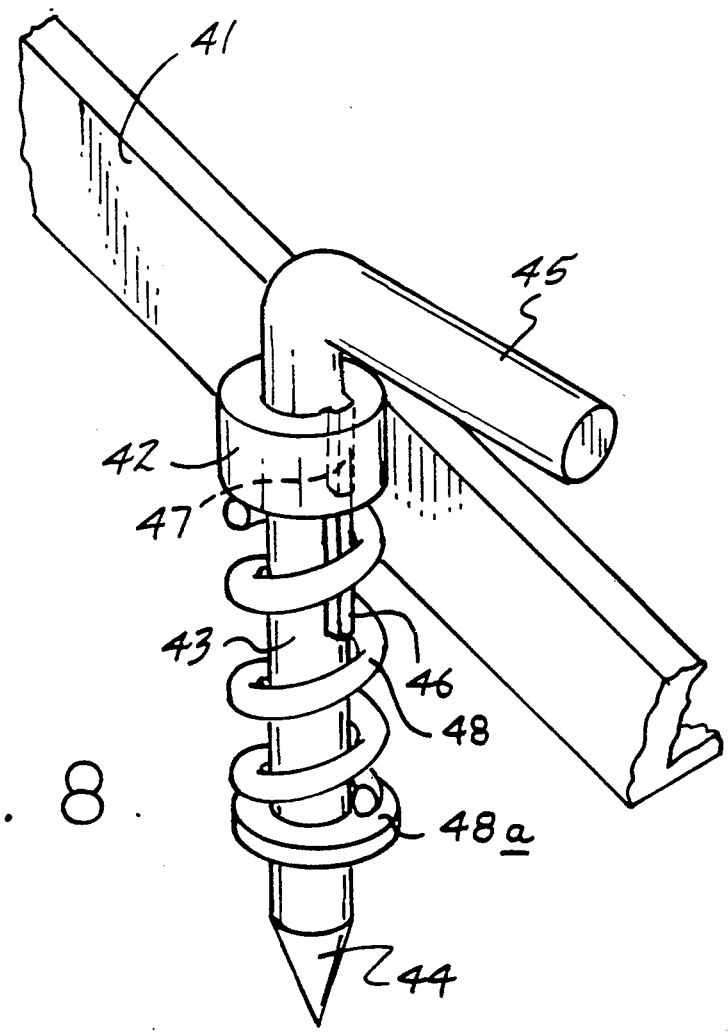
FIG. 8 is an enlarged isometric illustration of the locking rod structure.

The FIGS. 7 and 8 indicate the use of a position boss 42 mounted to a side wall of the second track defining a second track side wall 41. The position boss 42 includes a locking rod 43 slidably directed therethrough. The locking rod 43 includes a spline 46 received through a spline receiving slot 47. A rod handle 45 is orthogonally and fixedly mounted to the locking rod 43 to an uppermost side of the locking rod, wherein the lowermost side of the locking rod includes a lowermost pointed end 44 for projection to an underlying support surface. A spring 48 is captured between the position boss 42 and a spring plate 48a fixedly mounted upon the locking rod between the lowermost pointed end 44 and the position boss 42 to bias the locking rod in a projected relationship. In this manner, by directing of the spline 46 with the spline receiving slot 47 completely and then rotating the handle 45 to displace the spline relative to the slot, the locking rod is arranged in a projected relationship, whereupon re-alignment of the spline 46 with the spline receiving slot 47 permits projection of the locking rod through the position boss 42.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wheel chair ramp apparatus, comprising,
    a first ramp member spaced from a second ramp member, the first ramp member including a first U-shaped track and a second U-shaped track, wherein the first U-shaped track includes a first track first end plate projecting beyond the first U-shaped track, and a first U-shaped track second end hinge hingedly mounting the first U-shaped track to the second U-shaped track, and the second ramp member includes a third U-shaped track, with a third U-shaped first end plate extending beyond the third U-shaped track, and a third U-shaped track second end ,hinge hingedly securing the third U-shaped track to a fourth U-shaped track, with the first U-shaped track having a first floor, the second track having a second floor, with the first floor and the second floor in a coplanar relationship in a first position and arranged in a parallel spaced relationship in a second position, with the third track having a third floor, the fourth track having a fourth floor, with the third floor and the fourth floor arranged in a coplanar relationship in the first position, and the third floor and the fourth floor arranged in a parallel spaced relationship In the second position, and the first U-shaped track having first track side walls, the third track having third track side walls, wherein one of said first track side walls is arranged in a facing relationship to a further one of said third track side walls, with a connector link adjustably directed between the first U-shaped track and the third U-shaped track and mounted to one of said first U-shaped track side walls and to a facing one of said third U-shaped track side walls, wherein the connecting link includes a first L-shaped link fixedly mounted to said one of said first track side walls, and a second L-shaped link mounted fixedly to one of said third track side walls, and with a first adjuster rod directed into the first L-shaped link and a second adjuster rod directed into the second L-shaped link, wherein the first adjuster rod and the second adjuster rod are arranged in a coaxially aligned relationship relative to one another, with the first adjuster rod having a right hand thread, the second adjuster rod having a left hand thread, and an internally threaded adjuster sleeve having a sleeve right hand threaded portion threadedly receiving the first adjuster rod, and a sleeve left hand threaded portion threadedly receiving the second adjuster rod.

2. An apparatus as set forth in claim 1 including a boss member mounted to the sleeve exteriorly thereof, with the boss member including a first spring plate extending over the first adjuster rod and a second spring plate extending over the second adjuster rod, the first adjuster rod having a plurality of first annular discs mounted about the first adjuster rod concentrically thereof, and second annular discs mounted to the second adjuster rod concentrically thereof, with the first spring plate having a first bifurcated engaging leg arranged to receive one of said first annular discs, and the second spring plate including a second bifurcated engaging leg arranged to receive one of said second annular discs.

3. An apparatus as set forth in claim 2 wherein the second U-shaped track includes at least one second track side wall, wherein the at least one second track side wall includes a position boss fixedly mounted thereon, and the position boss includes a locking rod slidably directed through the position boss, and the locking rod including a spline fixedly mounted onto the locking rod, with the locking rod including a locking rod lowermost pointed end and a locking rod upper end, wherein the pointed end and the upper end are on opposed sides of the position boss, and the upper end includes a handle fixedly mounted to the locking rod obliquely mounted thereto, and the position boss includes a spline receiving slot receiving the spline slidably therethrough, and the locking rod including a spring plate fixedly mounted to the locking rod between the position boss and the lowermost pointed end, and a spring captured between the spring plate and the position boss.

* * * * *